United States Patent [19]

Miller et al.

[11] Patent Number: 4,768,605

[45] Date of Patent: Sep. 6, 1988

[54] APPARATUS FOR USE IN A POWER STEERING SYSTEM

[75] Inventors: Laurence L. Miller, West Lafayette; Jim L. Rau, Lafayette, both of Ind.

[73] Assignee: TRW Inc., Lyndhurst, Ohio

[21] Appl. No.: 93,802

[22] Filed: Sep. 4, 1987

[51] Int. Cl.$^4$ .............................................. B62D 5/08
[52] U.S. Cl. .................................... 180/143; 91/433; 91/452; 417/300
[58] Field of Search ...................... 180/143, 141, 132; 91/451, 452, 433, 421; 417/300, 302

[56] References Cited

U.S. PATENT DOCUMENTS

| 4,570,667 | 2/1986 | Masica et al. | 137/117 |
| 4,691,797 | 9/1987 | Miller | 180/143 |

Primary Examiner—John A. Pekar
Attorney, Agent, or Firm—Tarolli, Sundheim & Covell

[57] ABSTRACT

A power steering system includes a bypass valve assembly which bypasses fluid from a main conduit connected with a power steering pump and motor. The bypass valve assembly is urged toward an open condition, bypassing fluid from the main conduit, with a force which varies as a function of the fluid pressure drop across an orifice in the main conduit. The bypass valve assembly is urged toward a closed condition by a spring. In addition a pressure responsive pilot valve assembly opens to communicate the fluid pressure in the main conduit to the bypass valve to urge the bypass valve assembly toward the closed condition. This decreases the rate at which fluid from the power steering pump is bypassed to thereby increase the amount of fluid available for actuation of the power steering motor.

12 Claims, 5 Drawing Sheets

APPARATUS FOR USE IN A POWER STEERING SYSTEM

BACKGROUND OF THE INVENTION

The present invention relates to a power steering system having a bypass valve which directs excess fluid flow from a pump to reservoir.

A known power steering system includes a pump, a steering control valve which is actuated by turning of a vehicle steering wheel, and a power steering motor for assisting in moving the vehicle wheels in response to actuation of the control valve. The pump is driven by the engine and provides fluid at a flow rate which varies as a function of the speed of operation of the engine. At high engine operating speeds, the output of the pump is substantially greater than at low engine operating speeds. A bypass valve directs excess fluid flow from the pump to the reservoir.

In a power steering system disclosed in U.S. Pat. No. 4,691,797 issued Sept. 8, 1987 and entitled Fluid Flow Control Apparatus for a Power Steering System, hydraulic fluid from a power steering pump flows through a flow control orifice to a power steering control valve. The flow control orifice creates a hydraulic pressure drop proportional to the rate of fluid flow. A flow control valve bypasses fluid in response to the hydraulic pressure drop.

In the power steering system disclosed in U.S. Pat. No. 4,691,797, the bypass flow control valve is controlled (i) in response to the fluid flow rate through the flow control orifice and (ii) in response to a pressure drop created by a small pilot fluid flow from the outlet of the pump through a variable orifice. The variable orifice is provided by a solenoid actuated valve located in the pilot fluid flow conduit. The solenoid actuated valve is controlled in response to vehicle speed, and acts to reduce fluid flow to the power steering motor as vehicle speed increases and while steering is occurring. Since the solenoid valve is actuated as a function of vehicle speed rather than demand for fluid by a power steering motor, the flow of fluid to the power steering motor is not reduced during operation of the vehicle at low speed in nonsteering conditions. This results in the power steering pump requiring an unnecessarily large amount of power at low vehicle operating speeds in nonsteering conditions.

The use of a solenoid actuated valve in a power steering system, in the manner disclosed in the aforementioned U.S. Pat. No. 4,691,797, could be objectionable. This is because under at least certain operating conditions, a solenoid actuated valve may not be as durable as a mechanical or fluid pressure actuated valve. In addition, it is believed that a mechanical or fluid actuated valve is simpler and easier to manufacture and install in a power steering system than a solenoid actuated valve.

SUMMARY OF THE INVENTION

A power steering system constructed in accordance with the present invention includes a bypass valve assembly which bypasses fluid from a main conduit connected with a power steering pump and power steering motor. The bypass valve assembly is urged toward an open condition, bypassing fluid from the main conduit, with a force which varies as a function of the fluid pressure drop across an orifice in the main conduit. The bypass valve assembly is urged toward a closed condition by a spring and by fluid pressure.

A pressure responsive pilot valve assembly provides the fluid pressure for urging the bypass valve toward the closed condition. As the load on a power steering motor increases, the pressure responsive pilot valve assembly operates to increase the fluid pressure force urging the bypass valve assembly closed. This decreases the rate at which fluid from the power steering pump is bypassed to thereby increase the amount of fluid available for actuation of the power steering motor. Since the pilot valve assembly is actuated by fluid pressure rather than a solenoid, the objections to solenoid operated valves are not applicable to the pressure responsive pilot valve assembly. In addition, the bypass valve is actuated as a function of demand for fluid by the power steering motor.

BRIEF DESCRIPTION OF THE DRAWINGS

The foregoing and other objects and features of the present invention will become more apparent to one skilled in the art upon a consideration of the following description in combination with the accompanying drawings wherein.

DESCRIPTION OF SPECIFIC PREFERRED EMBODIMENTS OF THE INVENTION

Figure 1:
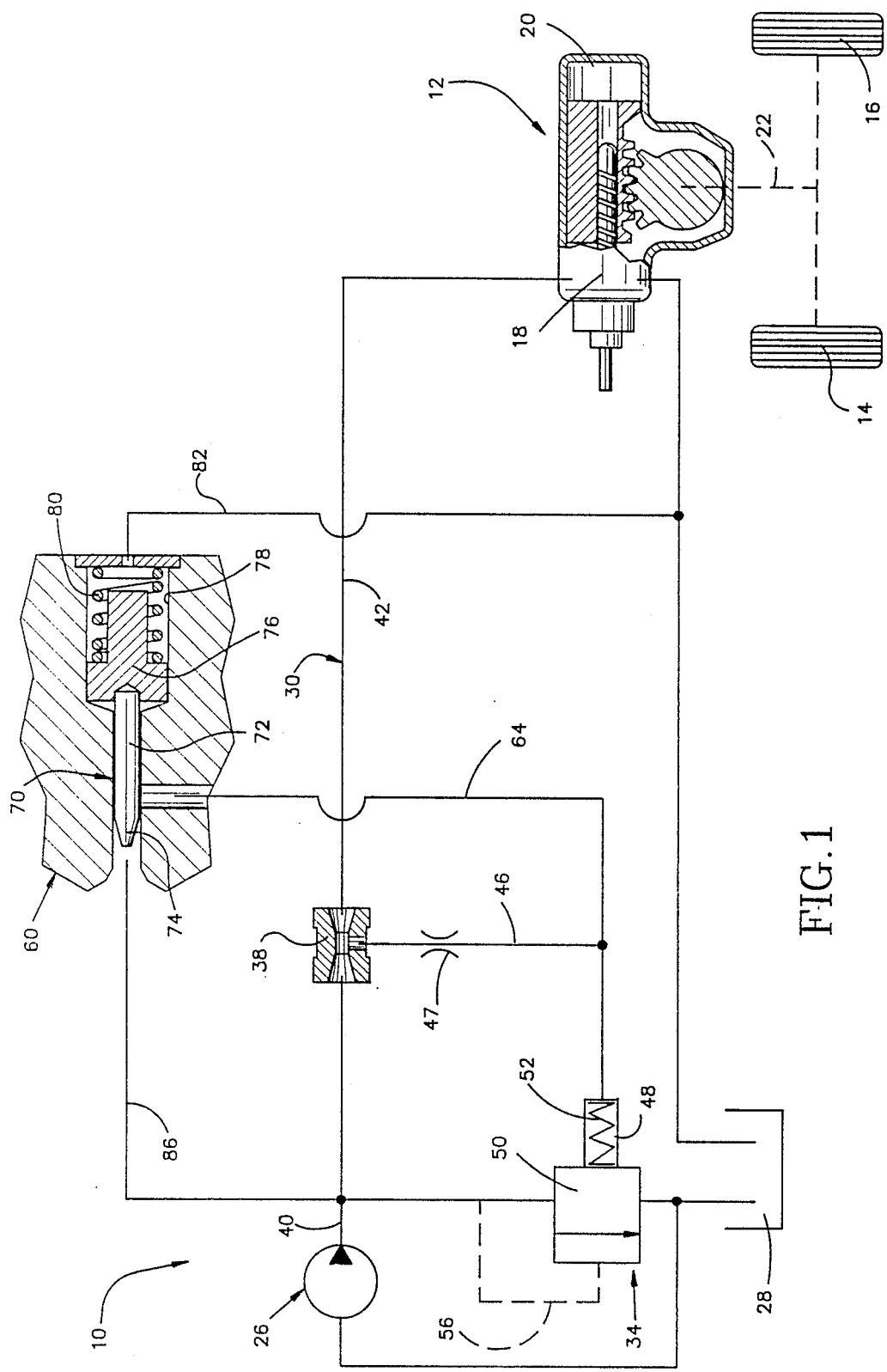
FIG. 1 is a schematic illustration of a power steering system constructed in accordance with the present invention and having a pressure responsive pilot valve assembly which increases the force urging a bypass valve assembly toward a closed condition as the load on a power steering motor increases.

A vehicle power steering system 10 (FIG. 1) includes a power steering mechanism 12 which is operable in response to rotation of a vehicle steering wheel (not shown) to turn steerable vehicle wheels 14 and 16. The power steering mechanism 12 includes an open center power steering control valve 18 which is operable, in response to rotation of the steering wheel, to port fluid under pressure to a power steering motor 20. The power steering motor 20 is connected with the steerable vehicle wheels 14 and 16 by a known steering linkage 22. The construction of the power steering mechanism 12 is described in U.S. Pat. No. 3,606,819 issued Sept. 21, 1971 and entitled Power Steering Gear Assembly. Other known power steering mechanisms could be used if desired.

A power steering pump 26 is driven by an engine of the vehicle to supply fluid under pressure to the power steering mechanism 12. The pump 26 draws fluid from a tank or reservoir 28. The pump 26 discharges fluid to a main conduit 30 which connects the pump in fluid communication with the power steering control valve 18.

A bypass valve assembly 34 directs excess fluid flow from the pump 26 back to the reservoir 28. Thus, a flow of fluid under pressure from the pump 26 is, during nonsteering conditions, conducted to the reservoir 28 through the open center power steering control valve 18 and through the bypass valve assembly 34. The higher the engine operating speed, the greater is the output from the pump 26 and the more fluid which is directed to the reservoir 28 through the bypass valve assembly 34. During a steering operation, the amount of fluid directed to the reservoir 28 through the bypass valve assembly 34 is reduced depending upon the demand for fluid by the power steering mechanism 12.

A flow control orifice 38 is disposed in the main conduit 30. The flow control orifice 38 is connected with the power steering pump 26 by a first section 40 of the main conduit 30 and is connected with the power steering control valve 18 by a second section 42 of the main conduit 30. Although the flow control orifice 38 could have many different constructions, in one specific embodiment of the invention, the orifice 38 is a venturi having the construction illustrated in U.S. Pat. No. 3,384,020 issued May 21, 1968 and entitled Pump.

A control pressure conduit 46 is connected to the throat of the flow control orifice 38 through a secondary orifice 47. The conduit 46 conducts a hydraulic control signal which varies as a function of the rate of flow through the flow control orifice 38. The control pressure conduit 46 is connected in fluid communication with a pressure chamber 48 in the bypass valve assembly 34. The fluid pressure in the chamber 48 urges a bypass valve member 50 toward the illustrated closed condition. A biasing spring 52 is provided in the chamber 48 and acts with the fluid pressure in urging the bypass valve member 50 toward the closed condition.

The bypass valve assembly 34 is urged toward the open condition by fluid pressure conducted from the first section 40 of the main conduit 30 through a pressure conduit 56. Since the first section 40 of the main conduit 30 is upstream of the flow control orifice 38, the fluid pressure in the conduit 56 will be greater than the pressure of the hydraulic control signal conducted through the conduit 46 from the flow control orifice. When the difference in the pressures in conduits 56 and 46 is sufficiently great, the force of the spring 52 will be overcome and the bypass valve member 50 will move to an open condition.

When the output from the power steering pump 26 exceeds the fluid flow requirements of the power steering mechanism 12, such as during a nonsteering condition, the fluid pressure in the first section 40 of the main conduit 30 will substantially exceed the fluid pressure in the second section 42 of the main conduit 30. This pressure differential, when it exceeds the force of spring 52, moves the bypass valve member 50 from the closed condition indicated in FIG. 1 to an open condition bypassing fluid back to the reservoir 28. The extent of movement of the bypass valve member 50 from the closed condition to an open condition will depend upon the amount by which the fluid pressure in the conduit 56 exceeds the fluid pressure in the conduit 46. Thus, during nonsteering conditions, the bypass valve member 50 moves to an open position to bypass fluid at a rate which is a function of the difference between the fluid pressures in the conduits 46 and 56.

When the steering wheel is rotated to actuate the open center power steering control valve 18, the power steering control valve 18 restricts fluid flow to the reservoir 28 and directs fluid flow to the power steering motor 20. Due to the resistance encountered by the power steering motor 20 in turning the steerable vehicle wheels 14 and 16, the fluid pressure in the second section 42 of the main conduit 30 increases. This results in the bypass valve member 50 moving toward the closed position.

In accordance with a feature of the present invention, a pressure responsive pilot valve assembly 60 is provided to increase the force urging the bypass valve assembly 34 toward the closed condition whenever the fluid pressure in the first section 40 of the main conduit 30 exceeds a predetermined pressure. Actuation of the pilot valve assembly 60 provides a pilot pressure signal through a pilot conduit 64. The pilot fluid pressure signal modifies the flow control signal conducted through the conduit 46 to increase fluid pressure in the chamber 48 and the force urging the bypass valve assembly 34 toward the closed condition. By increasing the force urging the bypass valve assembly 34 toward its closed condition, the bypass valve member 50 moves to reduce and, perhaps, even stop the bypassing of fluid during a steering maneuver.

Although the pressure responsive pilot valve assembly 60 is actuated from its closed condition to an open condition whenever the fluid pressure in the first section 40 of the main conduit 30 exceeds a predetermined pressure, the extent to which the pressure responsive pilot valve assembly is opened will vary depending upon the fluid pressure in the first section 40 of the main conduit 30. Thus, the greater the fluid pressure in the first section 40 of the main conduit 30, the greater is the extent to which the pressure responsive pilot valve assembly 60 is opened and the greater is the fluid pressure transmitted through the pilot conduit 64 to the pressure chamber 48 in the bypass valve assembly 34. The greater the fluid pressure transmitted to the chamber 48 in the bypass valve assembly 34, the further the bypass valve member 50 is moved toward its fully closed position. There is a very small rate of fluid flow through the pilot valve assembly 60. This enables the pressure responsive pilot valve assembly 60 to operate quickly.

Since the fluid pressure in the first section 40 of the main conduit 30 increases as a function of the resistance to turning the steerable vehicle wheels 14 and 16, the pressure responsive pilot valve assembly 60 increases the fluid pressure urging the bypass valve assembly 34 toward its closed condition as a direct function of increases in resistance to operation of the power steering motor 22 upon actuation of the power steering control valve 18. If there is a relatively large resistance to turning of the steerable vehicle wheels 14 and 16, such as would be encountered during parking at low vehicle speeds, the pressure responsive pilot valve assembly 60 is actuated to a fully open condition. At this time, a relatively large fluid pressure signal is conducted to the pressure chamber 48 in the bypass valve assembly 34 to assist the spring 52 in moving the bypass valve member 50 toward a fully closed position. Therefore, whenever there is a relatively large resistance to operation of the power steering motor 20, the bypass valve assembly 34 moves toward a fully closed position so that a greater amount of the output of the pump 26 is available to perform a steering operation. When the pilot valve assembly 60 is open, there will be a limited flow of fluid from the conduit 46 through the secondary orifice 47 to the conduit 42.

The embodiment of the pilot valve assembly 60 illustrated in FIG. 1 includes an axially tapered pin 70 having a cylindrical body portion 72 and a conical nose end portion 74. An end of the pin 70 is connected with a piston 76 disposed in a cylindrical spring chamber 78. The piston 76 is urged toward the left (as viewed in FIG. 1) by a biasing spring 80 located in a spring chamber 78. The spring chamber 78 is connected with the reservoir 28 by a conduit 82 so that any fluid leakage in chamber 78 is communicated with the reservoir 28.

When the fluid pressure against the conical nose end portion 74 of the tapered pin 70 is less than a predetermined pressure, the tapered pin is in the fully closed position illustrated in FIG. 1. At this time, the cylindrical body portion 72 of the pin blocks fluid communication between a pilot conduit 86, connected with the first section 40 of the main conduit 30, and the pilot conduit 64, connected with the bypass valve assembly 34.

When the fluid pressure in the conduit 40 is increased in response to a steering operation, the fluid pressure applied against the nose end portion 74 of the tapered pin 70 increases and urges the pin away from the illustrated closed condition toward an open condition. The amount by which the fluid pressure in the first section 40 of the main conduit exceeds a predetermined fluid pressure determines the distance which the tapered pin 70 is moved toward the right (as viewed in FIG. 1) against the influence of the biasing spring 80. Thus, if the fluid pressure in the first section 40 of the main conduit 30 exceeds the predetermined fluid pressure by a relatively small amount, the pin 70 is moved through only a relatively small distance from the closed position illustrated in FIG. 1 to an open position. This results in a very small opening being formed around the nose 74 of the pin 70 to connect the pilot conduits 86 and 64 in fluid communication with each other.

As the fluid pressure in the first section 40 of the main conduit 30 increases, the distance which the tapered pin 70 is moved away from the illustrated closed position toward a fully open position increases. This results in an increase in the fluid communication between the conduits 86 and 64 and an increase in the fluid pressure transmitted to the chamber 48 to urge the bypass valve assembly 34 toward a closed condition. Thus, the pressure responsive pilot valve assembly 60 is operated from a closed condition to any one of many open conditions to modulate the fluid pressure force urging the bypass valve assembly 34 toward its closed condition as a function of the fluid pressure in the first section 40 of the main conduit 30, which is a function of the resistance to turning of the steerable vehicle wheels 14 and 16 during a steering operation.

When the vehicle is traveling straight ahead at a relatively low speed, a portion of the fluid output from the pump 26 will be transmitted through the open center steering control valve 18 to the reservoir 28. The remainder of the output from the pump 26 will be transmitted to the reservoir 28 through the open bypass valve assembly 34. At this time, the fluid pressure drop across the flow control orifice 38 will be sufficient to maintain the bypass valve assembly 34 in a partially open condition. However, the fluid pressure in the conduit 40 will be relatively low and the pressure responsive pilot valve assembly 60 will be in the closed condition illustrated in FIG. 1.

Any increase in output flow from the pump 26 will cause the pressure drop across the flow control orifice 38 to instantaneously increase. This results in operation of the bypass valve assembly 34 toward a fully open condition to increase the rate at which fluid is bypassed to the reservoir 28. At this time, a relatively small amount of power is required to drive the power steering pump 26.

Upon turning of the steerable vehicle wheels 14 and 16 at highway speeds, the resistance to operation of the power steering motor 20 causes the fluid pressure in both the first and second sections 40 and 42 of the main conduit 30 to increase. This causes the bypass valve assembly 34 to move toward a closed condition. In addition, the increase in fluid pressure in the first section 40 of the main conduit 30, if sufficient, causes the pressure responsive pilot valve assembly 60 to open. When this occurs, the fluid pressure from the pilot valve assembly 60 is transmitted to the pressure chamber 48 in the bypass valve assembly 34 to urge the bypass valve member 50 toward its closed position. This results in an increase in flow to the power steering motor. The extent to which the bypass valve member 50 moves toward its closed position will be determined by the pressure increase in the first section 40 of the main conduit 30. In one specific embodiment, during turning of the steerable vehicle wheels 14 and 16 at high speeds, the increased load applied to the power steering motor results in the fluid pressure in the first section 40 of the main conduit 30 increasing to about 150 psi. This fluid pressure is sufficient to initiate actuation of the pressure responsive pilot valve assembly 60 from its closed condition.

During parking or turning of the steerable vehicle wheels 14 and 16 at relatively low vehicle speeds, a relatively large resistance will be encountered to turning of the steerable wheels. As this occurs, there will be a substantial increase in the fluid pressure in both sections 40 and 42 of the main conduit 30. The increase in the fluid pressure in the first section 40 of the main conduit 30 will cause the pressure responsive pilot valve assembly 60 to be actuated to a fully open condition. When this occurs, the bypass valve assembly 34 will be quickly actuated toward a fully closed condition. This results in the a greater amount of the output of the pump 26 being available to turn the steerable vehicle wheels 14 and 16 against the relatively large resistance encountered during parking.

During parking of the vehicle at relatively slow speeds, the fluid pressure in the first section 40 of the main conduit 30 will increase to about 1,000 psi, depending upon the load encountered by the steerable vehicle wheels 14 and 16. This fluid pressure is sufficient to maintain the pilot valve assembly 60 in an open position. It should be understood that the foregoing specific pressures for specific steering conditions have been set forth merely for purposes of illustration and not for purposes of limitation of the invention.

It is contemplated that during operation of the power steering system 10 illustrated in FIG. 1, it may be desirable to vent the pilot conduit 64 and control pressure conduit 46 to prevent the occurrence of excessive fluid pressures in these conduits. In the embodiment of the invention illustrated in FIG. 2 this is prevented by a pressure relief valve assembly 90. Since the embodiment of the invention illustrated in FIG. 2 is generally similar to the embodiment of the invention illustrated in FIG. 1, similar components are designated with similar numerals, the suffix letter "a" being added to the numerals designating components of the embodiment of the invention illustrated in FIG. 2 to avoid confusion.

The pressure relief valve assembly 90 is provided between the conduit 64a and reservoir 28a. The pressure relief valve assembly 90 includes a valve member 92 (shown schematically) which is urged to a closed position by a spring 94. The valve member 92 is urged toward an open condition by fluid pressure conducted through a conduit 96 from the pilot conduit 64a and control pressure conduit 46a. Whenever the fluid pressure in the pilot conduit 64a or control pressure conduit 46a exceeds a predetermined fluid pressure, the relief valve member 92 is moved to its open position to vent the conduits 46a and 64a to reservoir.

When the pressure relief valve assembly 90 is actuated, the pilot flow control valve assembly 60a will be at least partially opened. At this time, the pressure drop across the pilot flow control valve assembly 60a will be approximately the same as the pressure drop across the flow control orifice 38a and secondary orifice 47a. Therefore, a pressure equilibrium condition will exist in the conduits 46a and 64a.

Figure 2:
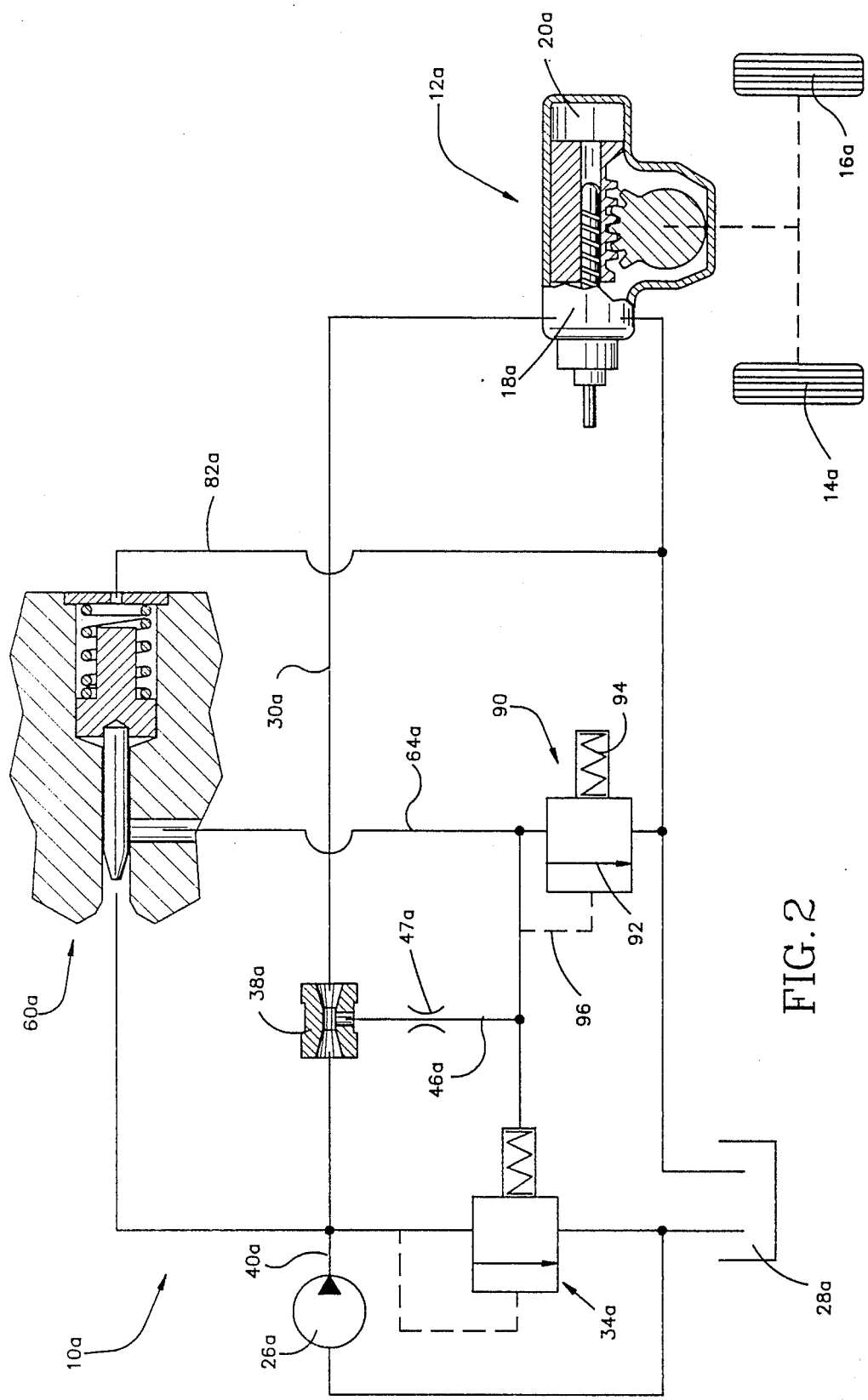
FIG. 2 is a schematic illustration of a power steering system, generally similar to the power steering system of FIG. 1 and having a pressure relief valve assembly.

In the embodiment of the invention illustrated in FIG. 2, there is a separate pressure relief valve assembly 90 and pilot flow control valve assembly 60a. Ease of assembly and compact construction can be promoted by combining the relief valve assembly 90 and pilot valve assembly 60a into a unitary structure in the manner illustrated in FIG. 3. Since the embodiment of the invention illustrated in FIG. 3 is generally similar to the embodiment of the invention illustrated in FIGS. 1 and 2, similar numerals are utilized to designate similar components, the suffix letter "b" being associated with the components of the embodiment of the invention shown in FIG. 3 to avoid confusion.

Figure 3:
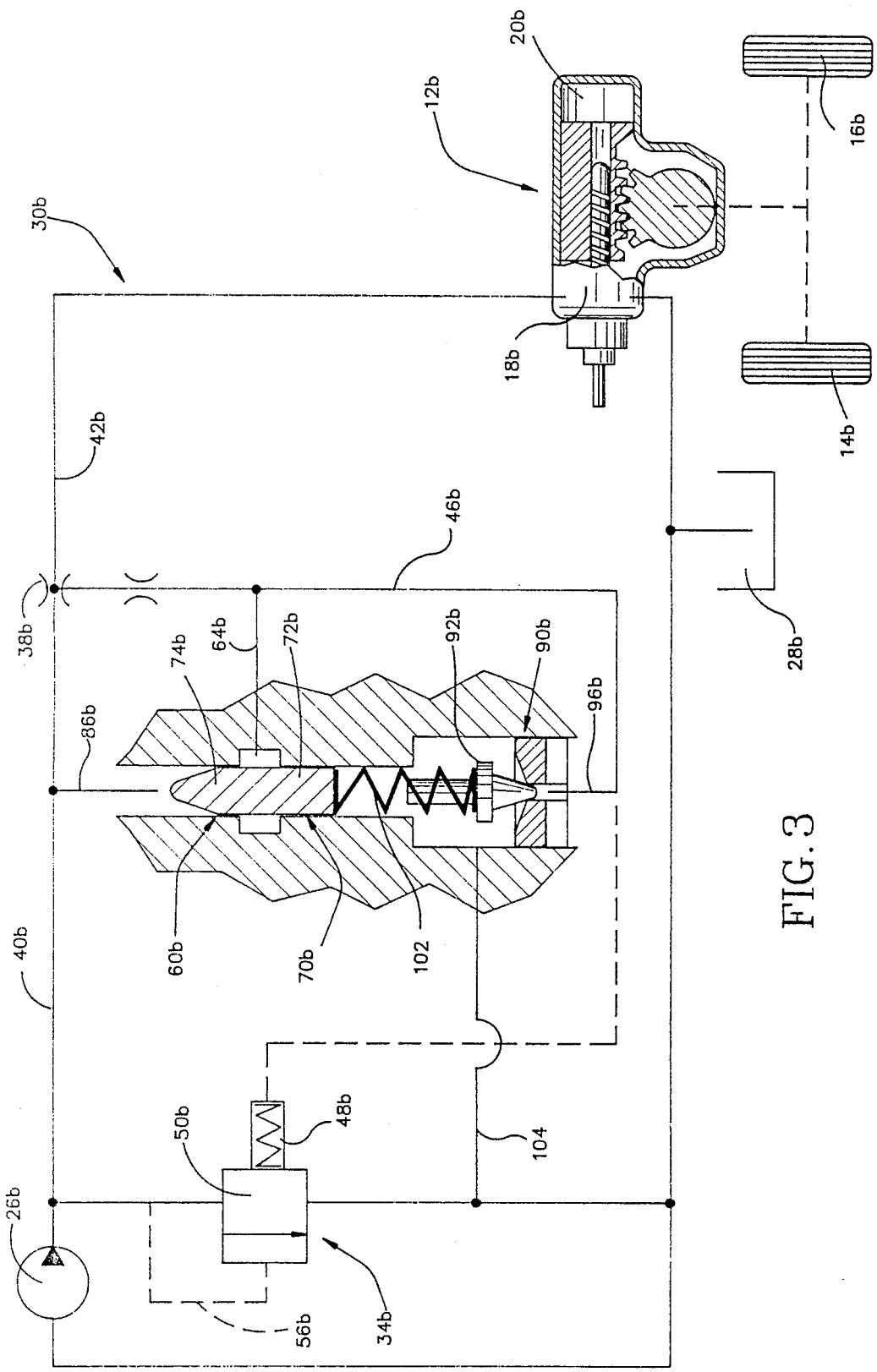
FIG. 3 is a schematic illustration of another embodiment of the invention, generally similar to the embodiment of FIG. 2, illustrating a combination pressure relief and pilot valve assembly.

A pressure responsive pilot valve assembly 60b includes a tapered pin 70b which is urged toward its closed position, illustrated in FIG. 3, by a biasing spring 102. The biasing spring 102 also urges a relief valve member 92b in a relief valve assembly 90b toward its closed position. Thus, only one biasing spring is required to urge both the pilot valve assembly 60b and the relief valve assembly 90b to their closed conditions.

The conical nose end portion 74b of the tapered pin 70b has a larger cross sectional area than the end portion of the relief valve member 92b which is exposed to the fluid pressure in the conduit 46b. Therefore, the tapered pin 70b in the pilot valve assembly 60b is moved to its fully open position before the relief valve member 92b moves away from its closed position illustrated in FIG. 3. However, after the pilot valve assembly 60b is operated to a fully open condition and the fluid pressure in the conduits 46b and 96b exceeds a predetermined fluid pressure, the pilot valve member 92b is moved from its closed position against the influence of the biasing spring 102 to vent the conduits 46b and 64b to reservoir 28b through a conduit 104.

Figure 4:
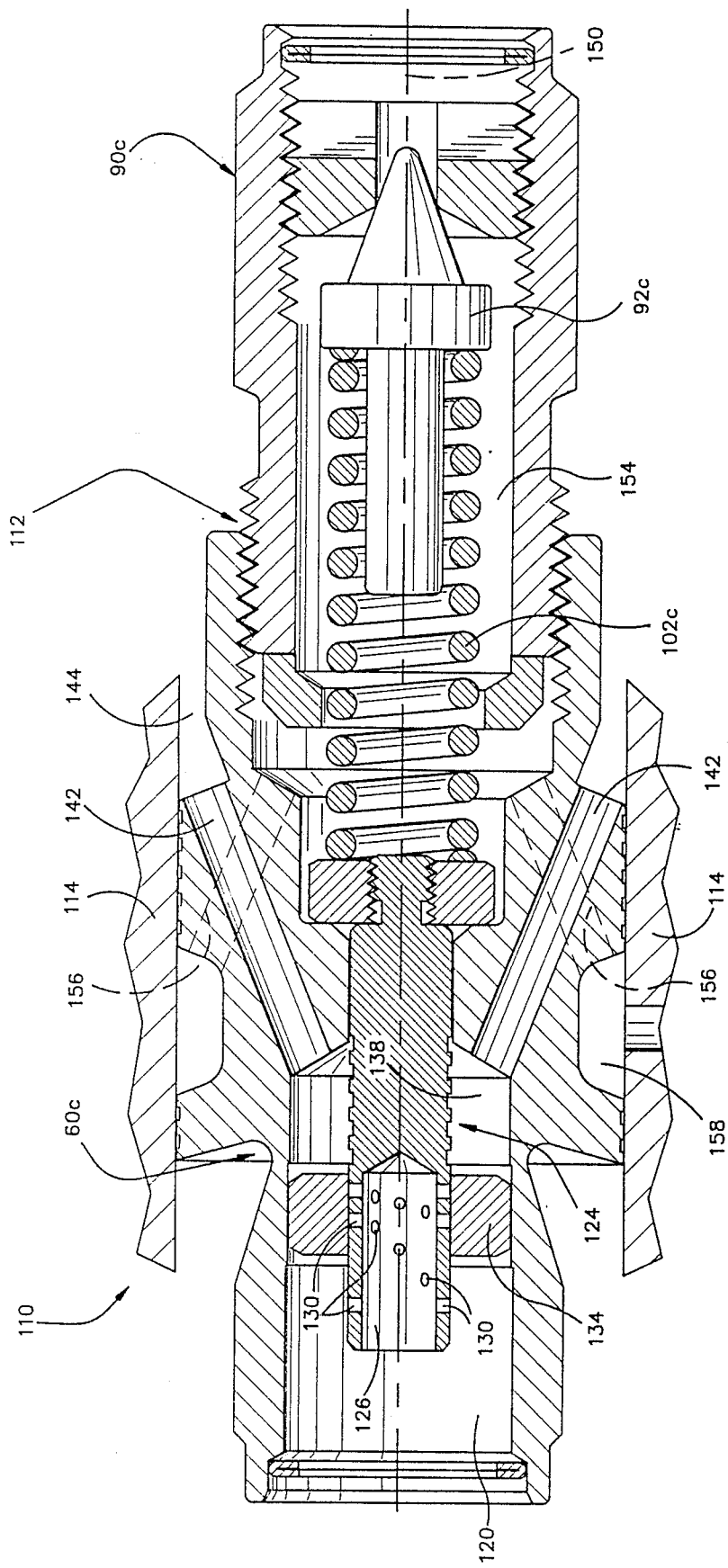
FIG. 4 is a sectional view of one embodiment of the combination pressure relief and pilot valve assembly of FIG. 3.
Figure 5:
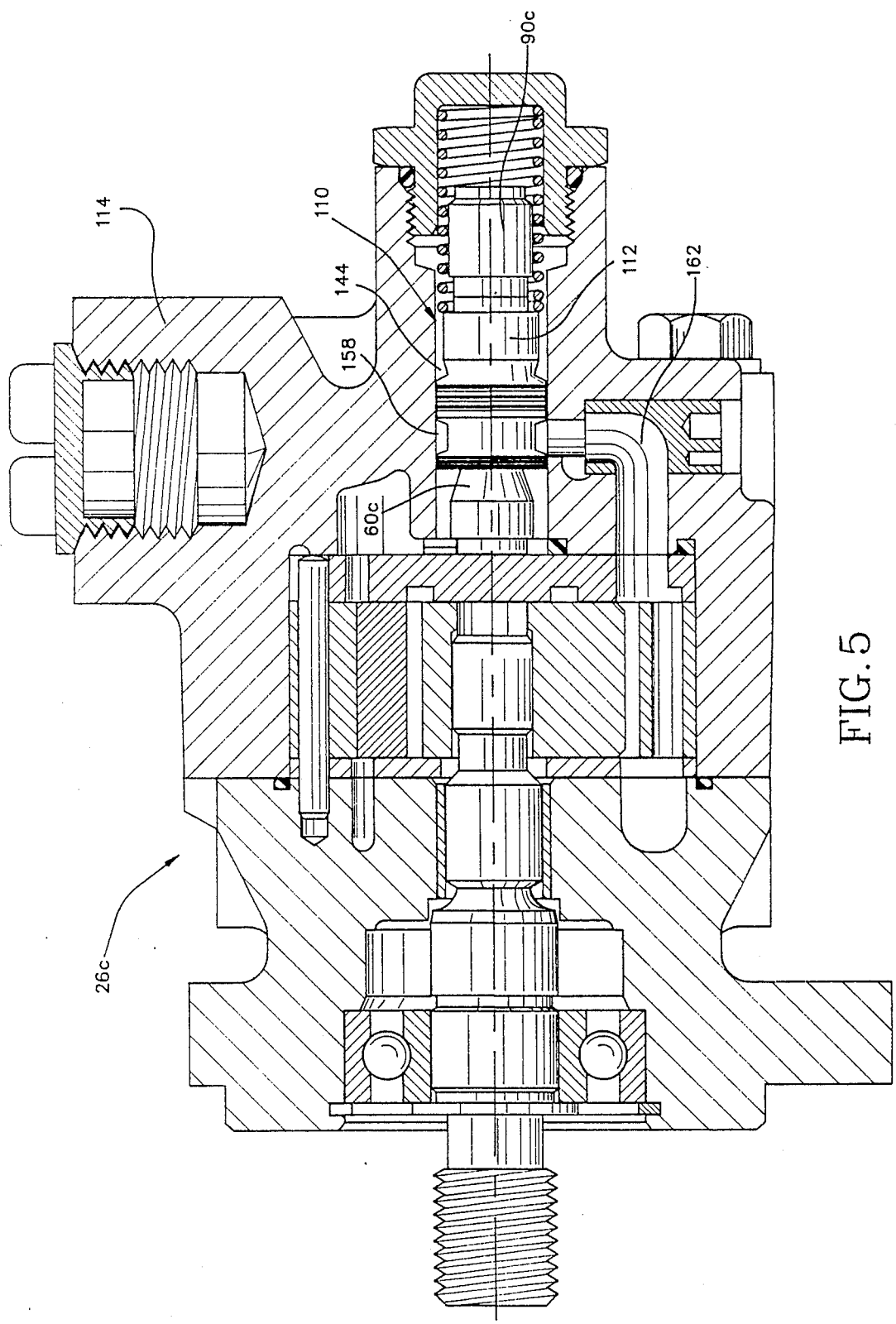
FIG. 5 is a sectional view illustrating the combination pressure relief and pilot valve assembly of FIG. 4 mounted in a power steering pump housing.

One specific preferred embodiment of the combined pilot valve assembly 60b and relief valve 90b of FIG. 3 is illustrated in FIGS. 4 and 5. Since the embodiment of the invention illustrated in FIGS. 4 and 5 is generally similar to the embodiments of the invention illustrated in FIGS. 1–3, similar numerals are utilized to designate similar components, the suffix letter "c" being associated with the embodiment of FIGS. 4 and 5 to avoid confusion.

As shown in FIG. 4 a pressure responsive pilot valve assembly 60c and a pressure relief valve assembly 90c are combined into one valve assembly 110. The pilot valve assembly 60c and pressure relief valve assembly 90c are enclosed within a common housing 112 which in turn is enclosed within a housing 114 (FIG. 5) of a pump 26c. The pump 26c is connected in fluid communication with a power steering mechanism, similar to the power steering mechanism 12b of FIG. 3, by a main conduit (not shown) corresponding to the main conduit 30b of FIG. 3.

The pressure responsive pilot valve assembly 60c (FIG. 4) includes a cylindrical inlet cavity 120 which is connected in fluid communication with the main conduit at a location upstream of a flow control orifice in the same manner as is the pilot valve assembly 60b of FIG. 3. The pilot valve assembly 60c of FIG. 4 includes an axially movable cylindrical valve member 124 having a recess 126 which opens to the inlet cavity 120. A plurality of circumferentially spaced apart and axially offset openings 130 are formed in the pilot valve member 124. The pilot valve member 124 is urged toward the closed position shown in FIG. 4 by a biasing spring 102c.

When the pilot valve member 124 is in the closed position of FIG. 4, the openings 130 are either blocked by an annular valve seat 134 or are exposed only to the inlet chamber 120. As the fluid pressure conducted from the first section of the main conduit to the inlet chamber 120 increases due to the initiation of a steering operation, fluid pressure causes the pilot valve member 124 to move rightwardly (as viewed in FIG. 4) against the influence of the biasing spring 102c. As this occurs, openings 130 in the pilot valve member 124 are exposed to a chamber 138. The chamber 138 is connected in fluid communication with the pilot conduit, corresponding to the pilot conduit 64b of FIG. 3, by a plurality of passages 142 which are connected with an annular chamber 144 extending around the valve housing and connected with the pilot conduit corresponding to the pilot conduit 64b.

The relief valve assembly 90c includes an inlet 150 which is connected in fluid communication with a fluid pressure conduit corresponding to the conduit 96b of FIG. 3. If the fluid pressure to which the relief valve assembly 90c is exposed exceeds a predetermined maximum pressure, a relief valve member 92c moves leftwardly (as viewed in FIG. 4) against the influence of biasing spring 102c to connect the inlet 150 with spring chamber 154. A plurality of passages 156 connect the spring chamber 154 in fluid communication with an annular chamber 158 which is connected with the reservoir. In the embodiment of the invention illustrated in FIG. 5, the annular chamber 158 is connected in fluid communication with the reservoir and with the inlet to the pump 26c by a passage 162 located in the pump housing 114.

In the illustrated embodiments of the invention, the fluid pressure conducted from the flow control orifice 38, 38a or 38b and the fluid pressure conducted from the pilot valve assembly 60, 60a or 60b are both directed to a single pressure chamber 48, 48a or 48b in the bypass valve assembly 34, 34a or 34b. Therefore, the control fluid pressure signal from the pilot valve assembly is combined with the control fluid pressure signal from the flow control orifice. However, it is contemplated that the conduit 46, 46a or 46b from the flow control orifice 38, 38a or 38b could be connected to one pressure chamber and the conduit 64, 64a or 64b from the pilot valve assembly 60, 60a or 60b, could be connected to a second pressure chamber.

It should be apparent from the above that applicant has provided a new and improved power steering system and that certain changes and modifications may be made therein by one skilled in the art, and it is intended to cover such changes and modifications coming within the scope of the appended claims.

Having described specific preferred embodiments of the invention, the following is claimed:

1. An apparatus for use in a power steering system having a power steering motor which is operable to turn steerable vehicle wheels in response to operation of a steering control valve, said apparatus comprising:

main conduit means for conducting fluid from a pump to the power steering control valve;

bypass valve means for bypassing fluid from said main conduit means;

control means for urging said bypass valve means toward an open condition with a force which varies as a function of variations in the rate of flow of fluid in said main conduit means; and pilot valve means for, when open, communicating fluid pressure in the main conduit means to said bypass valve means to urge said bypass valve means toward a closed condition and which pilot valve means opens in response to the fluid pressure in said main conduit means exceeding a predetermined fluid pressure.

2. An apparatus as set forth in claim 1 wherein said control means includes orifice means disposed in said main conduit means and means communicating the pressure drop across said orifice means to said bypass valve means to urge said bypass valve means toward the open condition.

3. An apparatus as set forth in claim 1 wherein said pilot valve means comprises a valve member having a surface area exposed to the fluid pressure in said main conduit and a spring biasing said valve member against said fluid pressure in the main conduit.

4. An apparatus as set forth in claim 1 wherein said pilot valve means is connected in fluid communication with said main conduit means at a location between said orifice means and the pump.

5. An apparatus as set forth in claim 1 wherein said pilot valve means includes a pilot valve member and spring means for urging said pilot valve member toward a closed condition, said apparatus further including pressure relief valve means for venting fluid pressure urging said bypass valve means toward the closed condition when the fluid pressure urging said bypass valve means toward the closed condition exceeds a predetermined fluid pressure, said relief valve means including a relief valve member which is urged toward a closed condition by said spring means.

6. An apparatus for use in a power steering system having a power steering motor which is operable to turn steerable vehicle wheels, said apparatus comprising:

pump means for supplying fluid under pressure from a reservoir;

steering control valve means for directing fluid under pressure to the power steering motor;

surface means for defining an orifice;

first main conduit means for conducting fluid flow from said pump means to said orifice;

second main conduit means for conducting fluid flow from said orifice to said steering control valve means;

bypass valve means connected in fluid communication with said first main conduit means and operable from a closed condition to an open condition to bypass fluid from said first main conduit means to the reservoir;

means for conducting fluid pressure to said bypass valve means to urge said bypass valve means toward the open condition;

a pressure responsive valve assembly connected in fluid communication with said first main conduit means and operable from a closed condition to an open condition under the influence of fluid pressure conducted from said first main conduit means; and means for conducting fluid pressure which varies as a function of variations in the fluid pressure in said first main conduit means from said pressure responsive valve assembly to said bypass valve means when said pressure responsive valve assembly is in an open condition to urge said bypass valve means toward the closed condition.

7. An apparatus as set forth in claim 6 wherein said pressure responsive valve assembly includes a pilot valve connected in fluid communication with said first main conduit means and operable from a closed condition to an open condition to port fluid pressure from said first main conduit means to said bypass valve means, a pressure relief valve operable from a closed condition to an open condition to port the fluid pressure urging said bypass valve means toward the closed condition to the reservoir, and a single spring for urging said pilot and relief valves toward their closed conditions.

8. An apparatus as set forth in claim 7 wherein said pressure responsive valve assembly is operable from the closed condition to the open condition to direct fluid pressure from said first main conduit means to said bypass valve means.

9. An apparatus for controlling fluid flow from a hydraulic pump to a hydraulic power steering mechanism, said apparatus comprising:

orifice means, through which fluid from the pump flows to the steering mechanism, for generating a hydraulic control signal proportional to the fluid flow rate through said orifice means;

flow control valve means for bypassing fluid flow away from the steering mechanism in response to said hydraulic control signal; and control means for modifying said hydraulic control signal including a pilot fluid circuit between the pump and said orifice means and a pressure responsive valve means in said pilot fluid circuit and operable under the influence of fluid pressure between the pump and said orifice means.

10. An apparatus as set forth in claim 9 wherein said pressure responsive valve means is operable to vary said hydraulic control signal as a function of variations in fluid pressure between said pump and said orifice means.

11. An apparatus as set forth in claim 9 wherein said control means further includes a relief valve means for venting said pilot fluid circuit when the fluid pressure in said pilot fluid circuit exceeds a predetermined fluid pressure.

12. An apparatus as set forth in claim 11 further including a single spring means for urging said pressure responsive valve means toward a closed condition and for urging said relief valve means toward a closed condition.

* * * * *